(12) United States Patent
Beardsley et al.

(10) Patent No.: US 6,425,050 B1
(45) Date of Patent: Jul. 23, 2002

(54) METHOD, SYSTEM, AND PROGRAM FOR PERFORMING READ OPERATIONS DURING A DESTAGE OPERATION

(75) Inventors: Brent Cameron Beardsley; Michael Thomas Benhase; Thomas Charles Jarvis; Robert Louis Morton; Kenneth Wayne Todd, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/398,381

(22) Filed: Sep. 17, 1999

(51) Int. Cl.⁷ .............................................. G06F 12/00
(52) U.S. Cl. ...................... 711/113; 711/143; 711/168; 714/5; 714/6
(58) Field of Search ................................ 711/113, 143, 711/168; 714/5, 6

(56) References Cited

U.S. PATENT DOCUMENTS

| | | | |
|---|---|---|---|
| 5,499,354 A | 3/1996 | Aschoff et al. | 711/129 |
| 5,574,902 A | 11/1996 | Josten et al. | 707/1 |
| 5,634,109 A | 5/1997 | Chen et al. | 711/143 |
| 5,717,893 A | 2/1998 | Mattson | 711/129 |
| 5,774,682 A | 6/1998 | Benhase et al. | 710/129 |
| 5,930,481 A * | 7/1999 | Benhase et al. | 711/112 |

OTHER PUBLICATIONS

Varma, Anujan and Jacobson, Quinn, "Destage Algorithms for Disk Arrays with Nonvolatile Caches", IEEE Transctions on Computers, V 47, No. 2, Feb. 1998; pp 229–235.*
U.S. Serial No. 09/261,683, filed Mar. 3, 1999, Method and System for Managing Meta Data.
U.S. Serial No. 09/261,824, filed Mar. 3, 1999, Method and System for Recovery of Meta Data in a Storage Controller.

* cited by examiner

Primary Examiner—Reginald G. Bragdon
(74) Attorney, Agent, or Firm—David W. Victor; Konrad Raynes Victor & Mann

(57) ABSTRACT

Disclosed is a method, system, and program for processing data access requests, such as read requests, to a storage location maintained in both a first storage, such as a cache, area and second storage area, such as a disk drive, during a destage operation. A destage operation is granted access to the storage location to destage data from the storage location in the first storage area to the second storage area. During the destage operation, a data access request is granted access to the storage location.

39 Claims, 5 Drawing Sheets

METHOD, SYSTEM, AND PROGRAM FOR PERFORMING READ OPERATIONS DURING A DESTAGE OPERATION

BACKGROUND OF THE INVENTION

1. Field of the Invention

The present invention is related to a method, system, and program for allowing data access operations to proceed with respect to a storage area while data in the storage area is being destaged.

2. Description of the Related Art

Computing systems often include one or more host computers ("hosts") for processing data and running application programs, direct access storage devices (DASDs) for storing data, and a storage controller for controlling the transfer of data between the hosts and the DASD. In addition to storing actual data, also known as user or customer data, the storage controller often maintains metadata which provides information on tracks or blocks of data in the DASD or in a cache of the storage controller. The storage controller processes the metadata during certain operations on the actual data represented by the metadata to improve the speed and efficiency of those requested operations. A track of metadata could include information on anywhere from a few hundred to a couple of thousand of user tracks to all tracks in a volume. Typically the rules for accessing metadata are less strict than for user data as metadata can be rebuilt. User data, on the other hand, is often managed in a manner that does not tolerate any potential loss of updates as the updates are not as easily recoverable as metadata.

In the International Business Machines Corporation (IBM) Storage Subsystem products, such as the 3990 Storage Controller, there are three main access modes for accessing tracks. One is shared, where access is granted if no readers or writers have exclusive access. A second mode is semi-exclusive, which is granted if no other user has exclusive or semi-exclusive access. After semi-exclusive access is granted, current reader and writers to the data may continue accessing the track, but no new readers or writers may access the track. Exclusive access is granted if no other process is accessing track, i.e., the track is idle. Following a grant of exclusive access no new processes are granted access.

Whenever exclusive or semi-exclusive access to a track is obtained, a wait flag is set in a cache directory control block (CDCB) to block any subsequent requests to the track while the wait flag is set "on." A CDCB is maintained for each track in cache and each CDCB maintains status information on one track. During semi-exclusive access, readers or writers that had access to the track prior to the granting of access could continue accessing the track, but the storage controller would deny subsequent access requests to the track after granting of semi-exclusive access in response to the setting of the CDCB wait flag.

Write and destage operations to user data require exclusive access. A stage operation to copy user data from storage into cache requires exclusive access. A first read request to user data initiates a stage operation to stage the requested data into cache and, thus, requires semi-exclusive access. Subsequent read requests to user data that is in cache only need shared access. Access to metadata is governed somewhat differently. Writes to metadata, unlike user data, do not require exclusive access to the track. Instead, the access required depends on the state of the metadata track. If the data is not in cache, then it must be staged into cache, which requires semi-exclusive access. After the data is staged into cache, subsequent read requests need only shared access. For metadata, the first update to the track requires semi-exclusive access. After the first write operation, further write requests only require shared access. All subsequent read operations on the metadata track staged into cache only need shared access.

A destage of a metadata and user data track currently requires exclusive access to the track. However, granting exclusive access could block others from accessing the user data and metadata track. This problem can be significant for metadata because numerous processes may request access to the metadata track representing perhaps thousands of user data tracks during the destage operation.

There is thus a need in the art for providing improved access mode when destaging metadata and user data to avoid delaying access requests.

SUMMARY OF THE PREFERRED EMBODIMENTS

To overcome the limitations in the prior art described above, preferred embodiments disclose a method, system, and program for processing data access requests to a storage location maintained in both a first storage area and second storage area during a destage operation. A destage operation is granted access to the storage location to destage data from the storage location in the first storage area to the second storage area. During the destage operation, a data access request is granted access to the storage location.

In further embodiments, the data access request is a read request. In such case, a determination is made as to whether it is acceptable to grant read requests access to the storage location during the destage operation. The read request is granted access to the storage location during the destage operation if it is determined acceptable to grant read requests access.

In embodiments where the data access request is a read access request, it is not acceptable to grant read requests access to the storage location during the destage operation unless all the data at the storage location in the second storage area has been copied into the storage location in the first storage area.

In further embodiments, the first storage area is a cache in volatile memory and the second storage area is a non-volatile storage device Preferred embodiments provide a method, system, and program for allowing read requests to access data tracks in the process of being destaged from cache to the storage device. This will prevent a delay in responding to a read request when the track is being destaged. In mission critical systems, delays in responding to read requests could delay the process requesting the data. This is even more likely if the requested data is metadata, as it is not uncommon that a read request to metadata will occur while the metadata is being destaged as metadata provides information on thousands of user data tracks. If a process cannot obtain metadata, then the process may not be able to proceed while the metadata track is destaged. Preferred embodiments minimize destage bottlenecks by allowing read requests access to a track while the track is being destaged.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
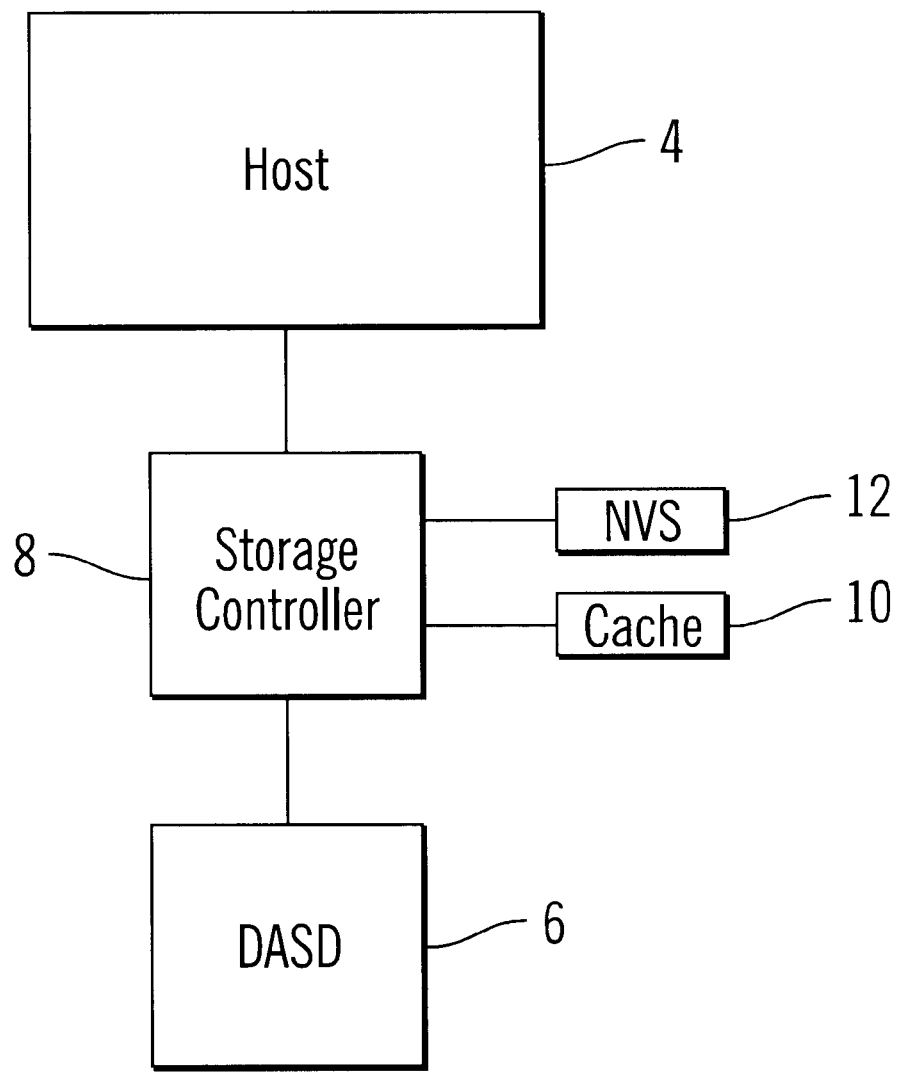
FIG. 1 is a block diagram illustrating a computing environment in which preferred embodiments of the present invention are implemented.

FIG. 1 illustrates a computing environment in which preferred embodiments are implemented. A host computer 4 performs data operations with respect to a DASD 6 via a storage controller 8 which manages access to the DASD 6. The storage controller 8 includes a cache 10. The storage controller 8 stages data from the DASD 6 into corresponding locations in the cache 10 that the host 4 requests. Similarly, data updates to tracks in the DASD 6 are stored in corresponding locations in the cache 10 until the data is destaged from cache 10 to DASD 6. The storage controller 8 may also copy any data updates written to cache 10 to a non-volatile storage unit (NVS) 12 to maintain for data recovery purposes. The NVS 12 is typically comprised of a battery backed-up volatile memory that can store the data updates for several hours in the event of a system failure.

The storage controller 8 may be comprised of the IBM 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety or the storage controller and host architecture described in the commonly assigned patent applications "Method And System For Dynamically Assigning Addresses To An Input/Output Device," by Brent C. Beardsley, Allan S. Merritt, Michael A. Paulsen, and Harry M. Yudenfriend, filed on Oct. 7, 1998, and having U.S. Pat. No. 6,185,638; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. Pat. No. 6,170,023, which patents are incorporated herein by reference in their entirety.

The host 4 may be comprised of any type of computing device, such as a mainframe computer, that includes a computing architecture capable of communicating input/output (I/O) commands to the storage controller 8, such as the IBM ESA/390** System described in the IBM publication: "Enterprise Systems Architecture/390: ESCON I/O Interface," IBM document no. SA22-7202-02 (Copyright IBM Corp., 1990, 1991, 1992), which publication is incorporated herein by reference in its entirety.

The DASD 6 may store data in a Count-Key-Data (CKD) format or fixed block address (FBA) format, such as the SCSI format. In the CKD format, each track includes one or more data records that are each prefaced with CKD information. The CKD information provides the name and format of a record, the key length, and the data length. The data field provides a variable length record of user data sets. The number of CKD records that can be placed on a track depends on the length of the data areas of the records. Alternatively, the DASD 6 may store data in addressable fixed blocks of data. In yet further embodiments, the DASD 6 may store data in any addressable storage unit known in the art, including CKD and FBA.

Tracks in the DASD 6 may have a track location in the cache 10, which is a copy of the track location in the DASD 6 to allow high speed access to the data and to receive updates in a manner that avoids having to access the track location in the physical storage devices of the DASD 6, which requires time consuming mechanical operations to move the read/write head to the track location in the DASD 6 storage medium. Further, multiple read requests can be serviced from cache 10, but not from the tracks in the DASD 6. For the first read request of user data, the storage controller 8 will stage into cache 10 the requested data records from DASD 6, not necessarily the entire track. For the first read request of metadata, the storage controller 8 stages in the entire metadata track. Write operations, i.e., updates, to records in a track are initially written to the cache 10 and then later destaged into DASD 6. A copy of an update may also be written to the NVS 12 to provide back-up storage of updates in case of a system failure.

A least recently used (LRU) queue is used to determine when to destage updates in cache 10 to DASD 6 in a manner known in the art. Those tracks for which there are records in cache 10 that have not been accessed for the longest time, i.e., at the least recently used end of the LRU queue, are destaged from cache 10 into DASD 6 to free space in the cache 10 for additional tracks and updates.

As discussed, in current storage systems, writes and destages to tracks in cache 10 require exclusive access of the track, whereas stages and a first read request of a track not in cache require semi-exclusive access. Read requests following the initial read only require shared access as the data is staged into cache following the first read request.

Reading While Destaging

Preferred embodiments allow for reading to occur while destaging user and metadata tracks from cache 10 to DASD 6. This would allow continued servicing of read requests while both user data and metadata is being destaged. Preferred embodiments are particularly useful when destaging metadata because it is not uncommon that a read request will occur while metadata is being destaged because a single metadata track can provide information for thousands of user data tracks. To allow for continued access of a user or metadata track during destage operations, the destage operation must allow shared access for read requests. However, there are at least two problems that could arise if read requests are allowed during destage operations.

First, is that if a read request is made to a user data track that is in the process of being destaged, then the read request could cause a staging operation for the track that is also being destaged. With user data, only those records previously accessed for a track are staged and maintained in cache. Thus, if there is a destage with respect to updates to some user records for a track in cache, it is possible that a read process could request records from the track currently being destaged that are not in cache 10. This read request would then trigger an operation to stage the requested records from DASD 6 to cache 10, thereby causing records to be staged from a track that is currently involved in a destage operation. This would result in two concurrent I/O operations on the same track, which is not allowed.

Another problem in allowing shared access during destage is that a shared write could modify metadata in a track while the track is being destaged. This could result in a destage of a part, but not all, of the update to the DASD 6. This could produce problems with the error check codes (ECC), such as a Longitudinal Redundancy Checking (LRC) code. LRC is a code used to check whether the data has not been corrupted, i.e., is used to validate the data. However, there is a possibility that LRC data in DASD 6 will not be current if data is updated and destaged at the same time. If data is written to a track in cache 10 while the track is being destaged, then the update may be destaged before the new LRC for the updated data is calculated. This could result in the old LRC being destaged to the DASD 6 with the updated data if the destage of the old LRC occurs after the update and before the new LRC is calculated. In such case, the LRC could not be used to validate the destaged data as the LRC is based on the data prior to the update.

Figure 2:
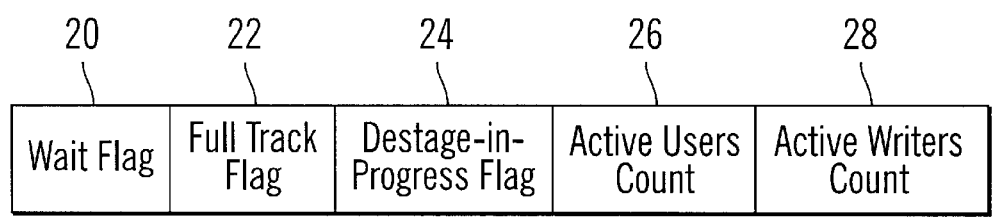
FIG. 2 illustrates flags and counters utilized with preferred embodiments of the present invention.

FIG. 2 shows flags and fields, which may be included in the CDCB for the track involved in the destage operation, that are used when permitting read operations to occur during a destage operation with respect to a track. The storage controller 8 would maintain a set of the flags and fields shown in FIG. 2 for each track that is in cache 10, either in part or in whole. A wait flag 20 is set when a process obtains exclusive or semi-exclusive access to a track to prevent subsequent writers or readers from gaining access. A full track flag 22 indicates whether the entire track is in cache 10. A destage-in-progress flag 24 indicates whether the track is currently subject to a destage operation. An active users counter 26 indicates the number of current readers, writers, destagers, and stagers that have access to the track and an active writers counter 28 indicates the number of active writers to a track. The active writers counter 28 is only applicable to metadata tracks because only metadata tracks permit multiple writers, whereas for user data, each writer must have exclusive access.

Figure 3:
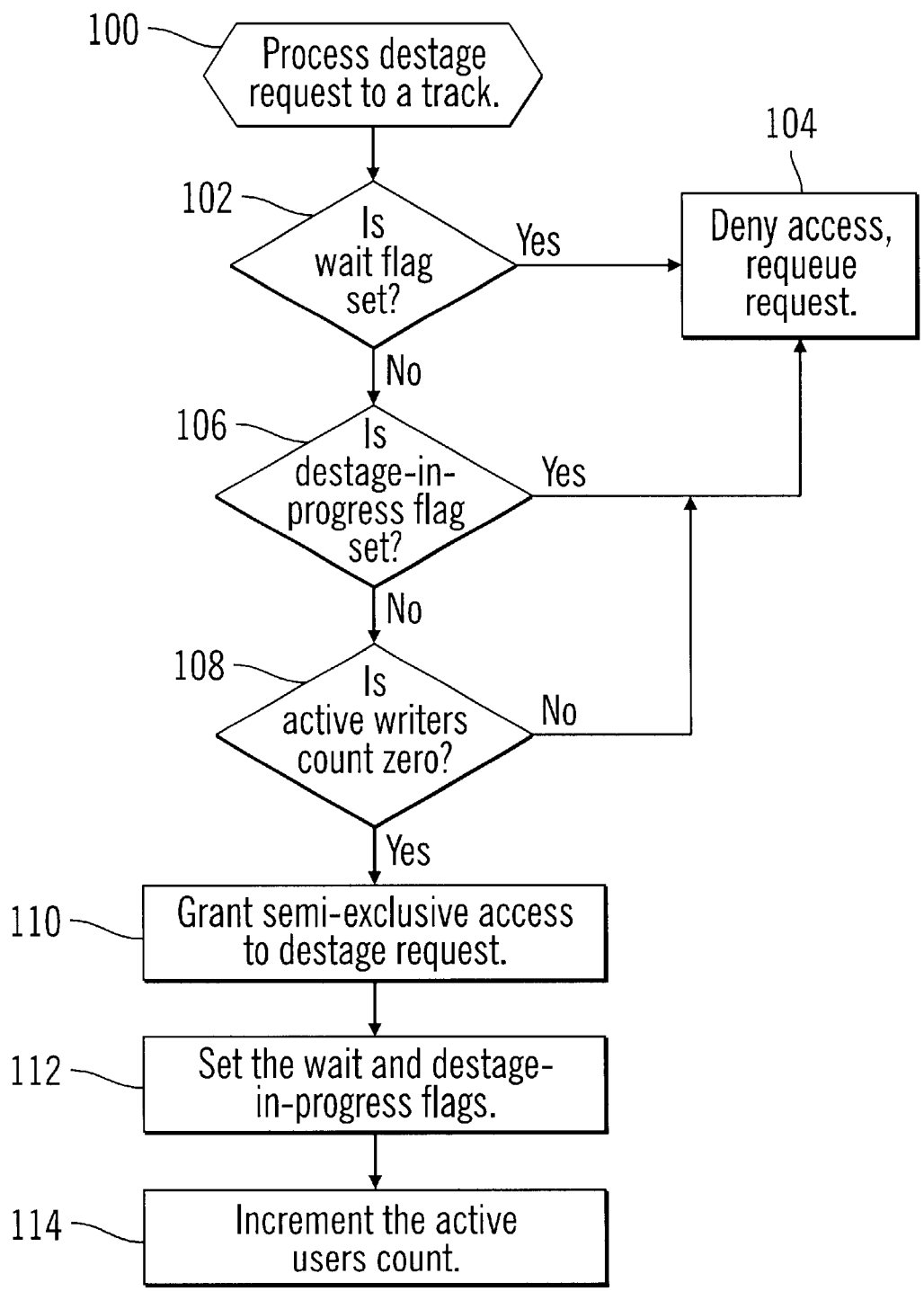
FIG. 3 illustrates logic to process a destage request for a track in accordance with preferred embodiments of the present invention.

FIG. 3 illustrates logic implemented in the storage controller 8 for granting access to a request to destage a track from cache 10 to DASD 6. This logic could apply to destaging of user and metadata tracks. Control begins at block 100 with the storage controller 8 processing a request to destage a track from cache 10. As discussed, a track will likely be destaged if it is on the least recently used end of a LRU queue maintained by the storage controller 8 to determine tracks in cache 10 to destage when the cache reaches a predetermined size threshold. The storage controller 8 determines if the wait flag 20 for the track is set. If so, then another request has exclusive or semi-exclusive access that does not permit further read or write access and the destage request is denied (at block 104). In such case, the storage controller 8 would queue the destage request on a request queue to process later.

If the wait flag is not set, then the storage controller 8 determines (at block 106) whether the destage-in-progress flag 24 is set. If so, the destage request is denied (at block 104), otherwise the storage controller 8 determines (at block 108) whether the active writers count 28 is zero. The active writers count 28 is used to prevent the situation where a destage request would be granted while there are current writers. As discussed, allowing writes to occur during destage could cause a destage of a partial update which would result in problems with the error check codes, such as LRC, maintained for the track in DASD 6. If there are active writers, i.e., the count 28 is not zero, then the destage request is denied and requeued (at block 104). Otherwise, if there are no active writes, the storage controller 8 grants (at block 110) semi-exclusive access to the destage request. The storage controller 8 further sets (at block 112) the wait 20 and destage-in-progress 24 flags to "on" and increments (at block 114) the active user count 26.

As discussed, preferred embodiments would allow active and new reads to occur during a destage operation, if conditions permit. As discussed, during semi-exclusive access, read requests already active when access was granted may continue. The active writers count 28 is used to prevent granting semi-exclusive access to a destage request when there are current writers. Thus, with the logic of FIG. 3, the storage controller 8 will only grant semi-exclusive access to a destage request if there are no writers; current readers are permitted. The logic of FIG. 4 is used to allow new read requests access to the track after the destage has begun by downgrading the destage access from semi-exclusive to shared access.

Figure 4:
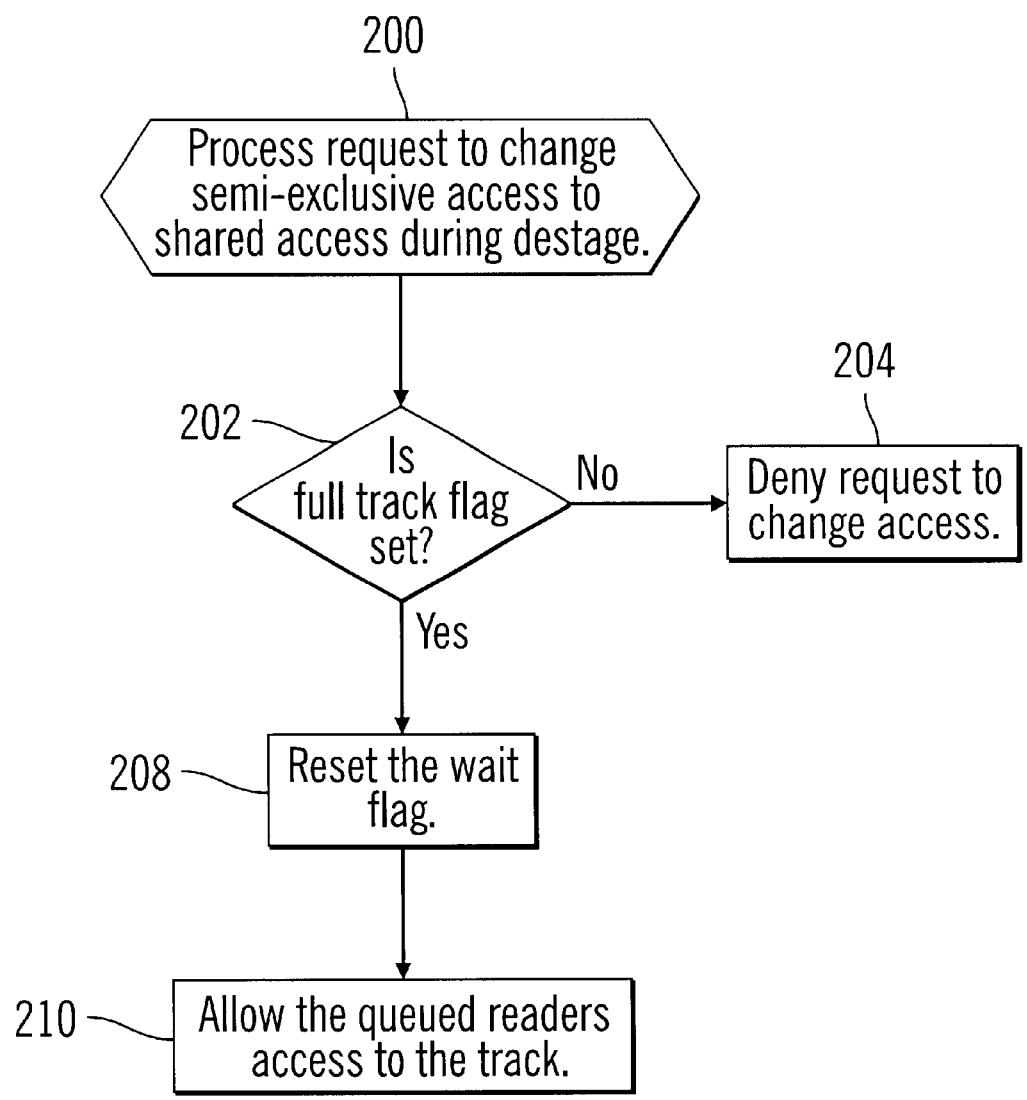
FIG. 4 illustrates logic to reduce access for a destage process to shared during the destage operation in accordance with preferred embodiments of the present invention.

With respect to FIG. 4, at block 200, the storage controller 8 generates and process a request to change the destage access from semi-exclusive to shared access during the destage operation. The storage controller 8 determines (at block 202) whether the full track flag 22 is set. If not, then request to change the access to shared is denied (at block 204). Otherwise, if the full track flag 22 is set, then the storage controller 8 resets (at block 208) the wait flag 20 to "off." After resetting the wait flag 20, queued read requests are allowed (at block 210) access to the track. Thus, with the logic of FIG. 4, the storage controller 8 attempts to downgrade the destage access to shared.

Semi-exclusive access is not released if the entire track is not in cache, otherwise a new read request could request user data records that are not in cache 10 and initiate a staging operation to stage the requested user records into cache 10. This would result in a concurrent destage and stage to the same track. For this reason, the storage controller 8 will not downgrade semi-exclusive access to shared to allow new read operations to access the track until the entire track is in cache 10, as indicated by the full track flag 22. Once the entire track is in cache 10, then new read requests to user data can access the track being destaged without triggering a stage operation. Note that this situation is not relevant for metadata, because the entire metadata track is staged into cache 10 upon first access. Thus, for metadata, access is set to shared without considering the full track flag 22. After downgrading semi-exclusive access, the storage controller 8 then resets the wait flag 20 to allow new readers during the destage operation. As discussed, if the wait flag 20 is on, no new readers or writers will be allowed access. Thus, preferred embodiments allow read operations to continue during the destage operation.

In this way, a destage operation would operate in shared access mode. Metadata write operations, which do not require exclusive access like user data write operations, would be denied access to the track during destage because the setting of the destage-in-progress flag 24 would block access. The storage controller 8 would not grant access to a metadata write operation if the destage-in-progress flag 24 is set "on", i.e., when a destage operation is ongoing. This would prevent the situation of writes to records that are being destaged, resulting in a destage of a partial write which could corrupt the error checking codes (ECC).

After destaging the data, the storage controller 8 needs to reset the flags and perform various clean-up operations, such as freeing up allocated segments in the NVS 12 storing destaged updates. Semi-exclusive access can be reobtained, because after relinquishing semi-exclusive access, the wait flag 20 is reset and the number of writers count 28 is zero. No new writers would be granted access even after semi-exclusive access is downgraded to shared, because the storage controller 8 will not grant access to writes when the destage-in-progress flag 24 is set. When reobtaining semi-exclusive access for the destage operation, the storage controller 8 sets the wait flag to "on" to prevent any new accesses. After performing clean-up operations following destage in a manner known in the art, the storage controller 8 would then release access for the destage operation and reset the wait flag 20 and destage-in-progress flag 24 to "off", and decrement the active users count 26. These reset operations would allow a write request for user data and metadata to access the track.

Figure 5:
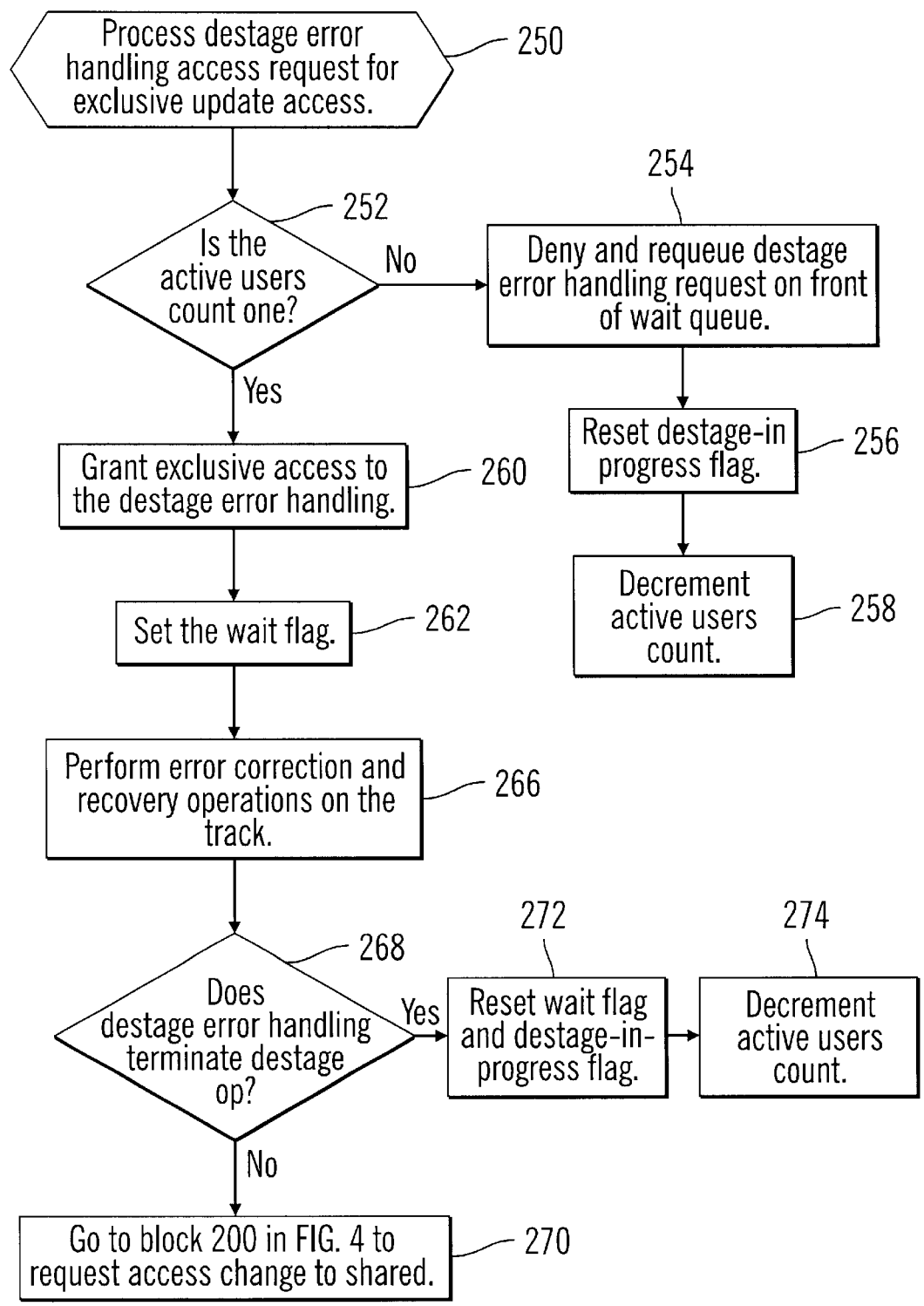
FIG. 5 illustrates logic to process a destage error handling request for exclusive update access in accordance with preferred embodiments of the present invention.

FIG. 5 illustrates logic implemented in the storage controller 8 to grant the destage error handling process exclusive access to perform error handling operations, such as recalculating the LRC codes if an LRC error is detected on the track. Control begins at block 250 with the storage controller 8 processing a destage error handling access request for exclusive update access. This event could occur when the destage process is destaging the track from cache 10 to DASD 6 and having shared access of the track being destaged. The storage controller 8 would determine whether the active users count 26 is one, i.e., whether the destage operation is the only process currently accessing the track. If there are processes accessing the track other than the destage, then the storage controller 8 denies access and requeues (at block 254) the destage error handling request at the front of the wait queue. The storage controller 8 then resets (at block 256) the destage-in-progress flag 24 to zero and decrements the active users count (at block 258). These steps allow subsequent read and write requests to the track to queue behind the error handling request which is placed at the front of the queue before other previously queued access requests. This ensures that the error handling request will be the first the storage controller 8 pulls of the queue to process and that no new processes will be granted access to the track before the error handling request obtains exclusive update access.

If the active users count 26 is one, then the destage operation is the only user that has access to the track at the moment, i.e., no other readers and writers, and the storage controller grants (at block 250) exclusive update access to the destage error handling process. In granting exclusive access, the storage controller 8 sets (at block 262) the wait flag 20 to prevent any other processes (writes or reads) from accessing the track. The storage controller 8 then performs (at block 266) error correction and recovery operations, which may include correcting the LRC values manners known in the art. After performing the error correction and recovery operations in a manner known in the art, the storage controller 8 determines (at block 268) whether the destage error handling operation terminates the destage operation. If not and there are further destaging operations to perform, then control proceeds (at block 270) to block 200 in FIG. 4 to determine whether to downgrade the access for the destage operation to shared from the exclusive access mode to allow read requests to access the track being destaged. Otherwise, if the destage error handling terminated the destage operation, then the storage controller 8 resets (at block 272) the wait flag 20 and destage-in-progress flag 24, and decrements (at block 274) the active users count 26. This allows future write or other operations to obtain any level of access over the track as the destage operation has completed.

With the logic of FIGS. 3–5, the storage controller 8 may permit read access to a user data or metadata track during a destage operation if certain conditions are met, such as the entire track is already staged in cache 10 and there are no active write processes accessing the track. Once the destage operation proceeds, no writes may occur. User data write operations require exclusive access. Although metadata writes can be shared, the storage controller 8 will not initiate a destage operation until all writes to the track have completed. Thus, a shared write access to a metadata track will not be granted while the wait flag 20 or destage-in-progress 22 flag is set. The wait flag 20 indicates that a semi-exclusive or exclusive process has access to the track and the destage-in-progress 24 flag indicates that the track is subject to a destage operation. These operations preclude access from any further writes. If a shared write obtains access to a metadata track, then the number of active users count 26 and active writers count 28 are incremented. Incrementing the active writers count 28 prevents a destage operation from obtaining access to the track. When a shared write to the metadata track completes and releases access, the active users count 26 and active writers count 28 are decremented.

The preferred embodiment logic for handling destage operations allows readers to access user data or metadata tracks subject to a destage operation. This is an improvement over the art as read requests can be immediately serviced during a destage operation and will not be requeued and delayed. This is especially important if the host 4 requesting the read operation needs the user data or metadata to continue a critical operation, where any delays could adversely affect the critical operation. Thus, preferred embodiments reduce bottlenecks caused by a destage operation by allowing read requests to proceed in a manner that does not threaten the integrity of the data.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Preferred embodiments were described with respect to a storage controller, host, and DASD system. In alternative embodiments, the preferred embodiment commands may be used with any type of storage system arrangement, where one processing unit performs data operations with respect to a storage device by communicating with another processing unit that manages and controls access to the storage device. The storage device storing the data may be any storage device known in the art, including volatile and non-volatile storage devices, such as tape drives, flash memory, optical disk drives, etc. Further the cache 10 may be any type of volatile or non-volatile storage area utilized by the storage controller 8 for data transfer operations.

The logic of the preferred embodiments, described with respect to the flowcharts, may be implemented in programmable gate arrays, such as a filled programmable gate array (FPGA) or complex programmable logic device (CPLD). In this way, the logic may be updated or reconfigured from files maintained in a non-volatile memory device that is part of the storage controller. These files including the code needed to configure the logic may be retrieved from over a network or from a provided memory device, such as a CD-ROM. Such readily programmable logic is especially useful for the initial introduction of a product where updates and fixes may need to be provided. Alternative embodiments may be implemented in non-programmable logic, such as application specific integrated circuits (ASICs), which are typically less expensive than the programmable logic devices.

Preferred embodiments were described as implemented in the IBM Storage Controller environment, wherein the flags and counters were included in a CDCB block. However, these components were described as one preferred implementation. In alternative systems, the flags and counters could be implemented in data structures other than a CDCB.

Preferred embodiments were described with respect to the CKD record format, where user data is stored in CKD records on a track, such that each CKD record includes a count field and may include a key field. The preferred embodiment commands may apply to other data storage formats in which data is stored in records that include index information, such as the count and/or key type information, along with the user data. Further preferred embodiments may apply to the SCSI storage format which stores data in fixed blocks without the use of index information with each data record.

In summary, preferred embodiments disclose a method, system, and program for processing data access requests to a storage location maintained in both a first storage area and second storage area during a destage operation. A destage operation is granted access to the storage location to destage data from the storage location in the first storage area to the second storage area. During the destage operation, a data access request is granted access to the storage location.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing data access requests to a data block maintained in both a first storage area and second storage area during a destage operation, comprising:
    granting a destage operation access to the data block to destage the data block from the first storage area to the second storage area;
    receiving a data access request to the data block during the destage operation; and
    granting the data access request access to the data block in the first storage area while destaging the data block from the first storage area to the second storage area if the data access request was initiated before the destage operation was granted access to the data block.

2. The method of claim 1, wherein the destage operation is not granted access to the data block if at least one write operation is currently accessing the data block.

3. The method of claim 1, wherein the first storage area is a cache in volatile memory and the second storage area is a non-volatile storage device.

4. The method of claim 1, wherein the data in the data block is one of metadata or user data.

5. The method of claim 1, wherein the data block comprises a track.

6. The method of claim 1, wherein the data access request comprises a read request.

7. A method for processing read requests to a data block maintained in both a first storage area and second storage area during a destage operation, comprising:
    granting a destage operation access to the data block to destage the data block from the first storage area to the second storage area;
    determining whether it is acceptable to grant one read request access to the data block during the destage operation, wherein it is not acceptable to grant read requests access to the data block during the destage operation unless all the data from the data block in the second storage area has been copied to the data block in the first storage area; and
    granting the read request access to the data block while destaging the data block from the first storage area to the second storage area if it is determined acceptable to grant the read request access to the data block.

8. A method for processing data access requests to a data block maintained in both a first storage area and second storage area during a destage operation, comprising:
    granting a destage operation access to the data block to destage the data block from the first storage area to the second storage area;
    granting a data access request access to the data block while destaging the data block from the first storage area to the second storage area;
    setting a first flag and a second flag after granting the destage operation access to the data block in the first storage area to prevent any further access requests to the data block;
    determining whether the entire data block in the second storage area is copied into the first storage area; and
    resetting the first flag to allow access to the data block in the first storage area if the entire data block in the second storage area is copied into the first storage area, wherein the second flag prevents write requests from accessing the data block in the first storage area during the destage operation.

9. The method of claim 8, wherein read requests are allowed access to the data block in the first storage area during the destage operation after the first flag is reset.

10. The method of claim 8, further comprising resetting the second flag after completing the destage operation.

11. The method of claim 10, further comprising denying data access requests to the data block in the first storage area while resetting the second flag and performing clean-up operations following a completion of the destage operation.

12. A method for processing data access requests to a data block maintained in both a first storage area and second storage area during a destage operation, comprising:
    granting a destage operation access to the data block to destage the data block from the first storage area to the second storage area;

granting a data access request access to the data block in the first storage area while destaging the data block from the first storage area to the second storage area;

processing an error handling request to obtain exclusive access to the data block;

granting the error handling request access to the data block unless there is at least one other data access request accessing the data block;

recalculating error checking codes for the data block; and returning to the destage operation and granting requests access to the data block after completing the error handling request if the error handling request did not terminate the destage operation and if all the data at the data block in the second storage area has been copied over to the first storage area.

13. The method of claim 12, wherein if there is at least one other data access request accessing the data block, then further performing;

denying the error handling request; and requeuing the denied error handling request on front of a wait queue.

14. A storage management system for processing data access requests to a data block maintained in both a first storage area and second storage area during a destage operation, comprising:

means for granting a destage operation access to the data block to destage the data block from the first storage area to the second storage area;

means for receiving a data access request to the data block during the destage operation; and means for granting the data access request access to the data block in the first storage area while destaging the data block from the first storage area to the second storage area if the data access request was initiated before the destage operation was granted access to the data block.

15. The system of claim 14, wherein the destage operation is not granted access to the data block if at least one write operation is currently accessing the data block.

16. The system of claim 14, wherein the first storage area is a cache in volatile memory and the second storage area is a non-volatile storage device.

17. The system of claim 14, wherein the data block in the first storage area is one of metadata or user data.

18. The system of claim 14, wherein the data block comprises a track.

19. The system of claim 14, wherein the data access request comprises a read request.

20. A system for processing read requests to a data block maintained in both a first storage area and second storage area during a destage operation, comprising:

means for granting a destage operation access to the data block to destage the data block from the first storage area to the second storage area;

determining whether it is acceptable to grant read requests access to the data block during the destage operation, wherein it is not acceptable to grant read requests access to the data block during the destage operation unless all the data from the data block in the second storage area has been copied into the first storage area; and means for granting the read request access to the data block while destaging the data block from the first storage area to the second storage area if it is determined acceptable to grant the read request access to the data block.

21. A system for processing data access requests to a data block maintained in both a first storage area and second storage area during a destage operation, comprising:

means for granting a destage operation access to the data block to destage the data block from the first storage area to the second storage area;

means for granting a data access request access to the data block while destaging the data block from the first storage area to the second storage area;

means for setting a first flag and a second flag after granting the destage operation access to the data block to prevent any further access requests to the data block;

means for determining whether the entire data block in the second storage area is copied into the first storage area; and means for resetting the first flag to allow access to the data block if the entire data block in the second storage area is copied into the first storage area, wherein the second flag prevents write requests from accessing the data block during the destage operation.

22. The system of claim 21, further comprising means for granting read requests access to the data block in the first storage area during the destage operation after the first flag is reset.

23. The system of claim 21, further comprising means for resetting the second flag after completing the destage operation.

24. The system of claim 23, further comprising means for denying data access requests to the data block in the first storage area while resetting the second flag and performing clean-up operations following a completion of the destage operation.

25. A system for processing data access requests to a data block maintained in both a first storage area and second storage area during a destage operation, comprising:

means for granting a destage operation access to the data block to destage the data block from the first storage area to the second storage area;

means for granting a data access request access to the data block in the first storage area while destaging the data block from the first storage area to the second storage area;

means for processing an error handling request to obtain exclusive access to the data block;

means for granting the error handling request access to the data block unless there is at least one other data access request accessing the data block;

means for recalculating error checking codes for the data block; and means for returning to the destage operation and granting requests access to the data block after completing the error handling request if the error handling request did not terminate the destage operation and if all the data at the data block in the second storage area has been copied over to the first storage area.

26. The system of claim 25, further comprising:

means for denying the error handling request if there is at least one other data access request accessing the data block; and means for requeuing the denied error handling request on front of a wait queue.

27. An article of manufacture for processing data access requests to a data block maintained in both a first storage area and second storage area during a destage operation, the article of manufacture comprising computer usable media including at least one computer program embedded therein that causes the computer to perform:

granting a destage operation access to the data block in the first storage area to destage the data block from the first storage area to the second storage area;

receiving a data access request to the data block during the destage operation; and granting the data access request access to the data block in the first storage area while destaging the data block from the first storage area to the second storage area if the data access request was initiated before the destage operation was granted access to the data block.

28. The article of manufacture of claim 27, wherein the destage operation is not granted access to the data block if at least one write operation is currently accessing the data block.

29. The article of manufacture of claim 27, wherein the first storage area is a cache in volatile memory and the second storage area is a non-volatile storage device.

30. The article of manufacture of claim 27, wherein the data in the data block is one of metadata or user data.

31. The article of manufacture 27, wherein the data block comprises a track.

32. The article of manufacture 27, wherein the data access request comprises a read request.

33. An article of manufacture for processing data access requests to a data block maintained in both a first storage area and second storage area during a destage operation, the article of manufacture comprising computer usable media including at least one computer program embedded therein that causes the computer to perform:

granting a destage operation access to the data block in the first storage area to destage the data block from the first storage area to the second storage area;

determining whether it is acceptable to grant read requests access to the data block during the destage operation, wherein it is not acceptable to grant read requests access to the data block during the destage operation unless all the data from the data block in the second storage area has been copied to the data block in the first storage area; and granting read requests access to the data block while destaging the data block from the first storage area to the second storage area if it is determined acceptable to grant the read requests access to the data block.

34. An article of manufacture for processing data access requests to a data block maintained in both a first storage area and second storage area during a destage operation, the article of manufacture comprising computer usable media including at least one computer program embedded therein that causes the computer to perform:

granting a destage operation access to the data block to destage the data block from the first storage area to the second storage area;

granting a data access request access to the data block while destaging the data block from the first storage area to the second storage area;

setting a first flag and a second flag after granting the destage operation access to the data block in the first storage area to prevent any further access requests to the data block in the first storage area;

determining whether the entire data block in the second storage area is copied into the first storage area; and resetting the first flag to allow access to the data block in the first storage area if the entire data block in the second storage area is copied into the first storage area, wherein the second flag prevents write requests from accessing the data block in the first storage area during the destage operation.

35. The article of manufacture of claim 34, wherein read requests are allowed access to the data block in the first storage area during the destage operation after the first flag is reset.

36. The article of manufacture of claim 34, further comprising resetting the second flag after completing the destage operation.

37. The article of manufacture of claim 36, further comprising denying data access requests to the data block in the first storage area while resetting the second flag and performing clean-up operations following a completion of the destage operation.

38. An article of manufacture for processing data access requests to a data block maintained in both a first storage area and second storage area during a destage operation, the article of manufacture comprising computer usable media including at least one computer program embedded therein that causes the computer to perform:

granting a destage operation access to the data block to destage the data block from the first storage area to the second storage area;

granting a data access request access to the data block while destaging the data block from the first storage area to the second storage area;

processing an error handling request to obtain exclusive access to the data block;

granting the error handling request access to the data block unless there is at least one other data access request accessing the data block;

recalculating error checking codes for the data block; and returning to the destage operation and granting requests access to the data block after completing the error handling request if the error handling request did not terminate the destage operation and if all the data at the data block in the second storage area has been copied over to the first storage area.

39. The article of manufacture of claim 38, wherein if there is at least one other data access request accessing the data block, then further performing;

denying the error handling request; and requeuing the denied error handling request on front of a wait queue.

* * * * *